Aug. 24, 1926.
E. KRGSSIK
FLOWERPOT
Filed Oct. 19, 1925
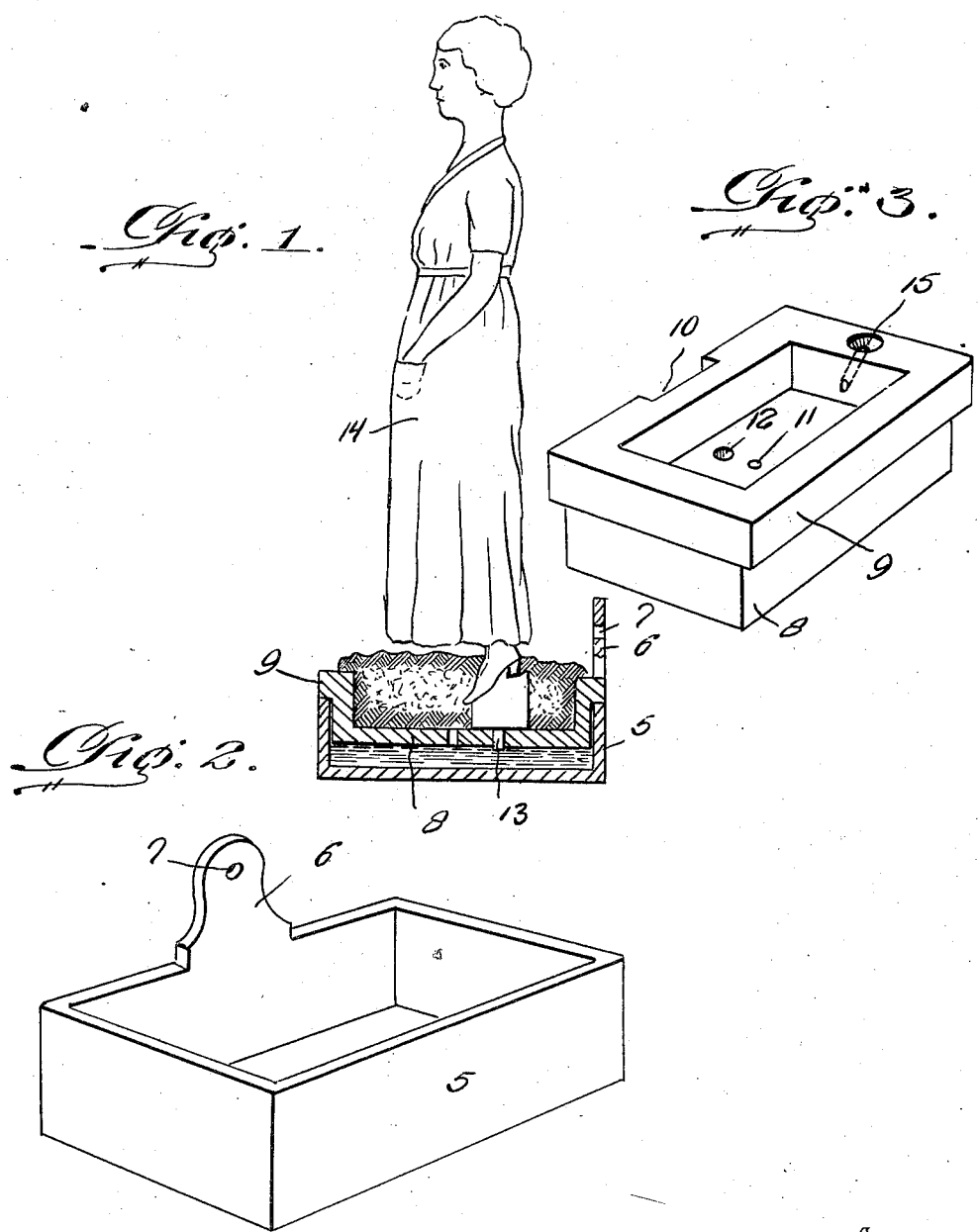

Patented Aug. 24, 1926.

1,597,380

UNITED STATES PATENT OFFICE.

EDWARD KRGSSIK, OF ALTON, ILLINOIS.

FLOWERPOT.

Application filed October 19, 1925. Serial No. 63,439.

The present invention relates to a flower pot and aims to provide a structure including a water box, an earth pot supported in the water box and a bracket formed on the water box and adapted to be attached to the wall.

An important object of the invention is to provide a flower pot of this nature which is exceedingly simple in its construction, attractive in its appearance, easy to assemble and disassemble, efficient and reliable in its use, compact and convenient, and otherwise well adapted to the purpose for which it is designed.

With the above and numerous other objects in view as will appear as the description proceeds, the invention resides in certain novel features of construction, and in combination and arrangement of parts as will be hereinafter more fully described and claimed.

In the drawing:—

Figure 1 is a vertical transverse section through the flower pot assembled,

Figure 2 is a detail perspective view of the water box, and

Figure 3 is a detail perspective view of the earth pot.

Referring to the drawing in detail it will be seen that 5 designates the water box which is provided with a hanger bracket 6 rising from the edge of one wall and provided with an aperture 7 for attaching the bracket to a wall of a room or the like to support the box 5. An earth pot 8 is provided at its upper edge with an outwardly disposed shoulder 9 adapted to rest on the upper edge of the box 5, said shoulder being provided with a recess 10 adapted to receive the bracket 6. A drain opening 11 is provided in the bottom of the pot 8 centrally thereof and an opening 12 is provided in the bottom adjacent the rear wall of the pot for the purpose of receiving a pin 13 of a figure 14. A water passage 15 is provided in one end wall of the pot 8 terminating interiorly thereof so that water may be poured therethrough into the pot and drained through the opening 11 into the box 5. The pot 8, of course, is adapted to receive earth as is shown to advantage in Figure 1 in order that flowers may be grown therein.

From the above it will be seen that the device is exceedingly simple in its construction and when the flowers are growing in the earth carried in the pot 8 that the device will be of a highly attractive nature. The various parts may be either plain or ornamented, and may differ in shape from that shown in the drawing. The earth in the pot will be maintained in a moist condition because of the water which collects in the box 5 below the bottom of the pot 8. The bottom of this pot 8 is spaced above the bottom of the box 5, as is clearly shown in Figure 1.

It is thought that the construction, utility, and advantages of the invention will now be clearly understood without a more detailed description thereof.

It is apparent that changes in the details of construction, and in the combination and arrangement of parts may be resorted to without departing from the spirit or scope of the invention as hereinafter claimed or sacrificing any of its advantages.

Having thus described my invention, what I claim as new is:—

A device of the class described including a water box, a hanger bracket rising from one edge of the water box and provided with an aperture, an earth pot having a shoulder extending outwardly from its upper edge for resting on the upper edge of the water box and provided with a notch to receive the bracket, the bottom of said pot being provided with a drain opening, one wall of the pot being provided with a passage extending from the upper edge thereof to the interior of the pot adjacent the bottom thereof.

In testimony whereof I affix my signature.

EDWARD KRGSSIK.